ium in a light water moderated reactor. The assem-
United States Patent

Cawley et al.

[11] Patent Number: 4,526,741
[45] Date of Patent: Jul. 2, 1985

[54] FUEL ASSEMBLY FOR THE PRODUCTION OF TRITIUM IN LIGHT WATER REACTORS

[75] Inventors: William E. Cawley; Turner J. Trapp, both of Richland, Wash.

[73] Assignee: The United States of America as represented by the United States Department of Energy, Washington, D.C.

[21] Appl. No.: 503,129

[22] Filed: Jun. 10, 1983

[51] Int. Cl.³ .............................................. G21C 3/00
[52] U.S. Cl. ................................... 376/185; 376/209; 376/435; 376/447; 376/449; 376/455
[58] Field of Search ............... 376/185, 435, 447, 431, 376/189, 455, 209, 419, 449

[56] References Cited

U.S. PATENT DOCUMENTS

| | | | |
|---|---|---|---|
| 2,870,076 | 1/1959 | Koch | 376/158 X |
| 2,983,663 | 5/1961 | Bassett | 376/419 |
| 3,042,598 | 7/1962 | Crowther | 376/419 X |
| 4,123,328 | 10/1978 | Radkowsky et al. | 376/435 X |
| 4,148,687 | 4/1979 | Chien et al. | 376/447 X |
| 4,235,669 | 11/1980 | Burgess et al. | 376/435 X |
| 4,432,934 | 2/1984 | Gjertsen et al. | 376/209 X |

FOREIGN PATENT DOCUMENTS

| | | | |
|---|---|---|---|
| 150582 | 11/1979 | Japan | 376/419 |
| 2065955 | 7/1981 | United Kingdom | 376/189 |

OTHER PUBLICATIONS

"A Brief Summary of Different Tritium Sources for a Tritiumless Hybrid Reactor", Moses, p. 7, Oct. 1979.

Primary Examiner—Deborah L. Kyle
Assistant Examiner—Dan Wasil
Attorney, Agent, or Firm—Robert Southworth, III; Judson R. Hightower

[57] ABSTRACT

A nuclear fuel assembly is described for producing tritium in a light water moderated reactor. The assembly consists of two intermeshing arrays of subassemblies. The first subassemblies comprise concentric annular elements of an outer containment tube, an annular target element, an annular fuel element, and an inner neutron spectrums shifting rod. The second subassemblies comprise an outer containment tube and an inner rod of either fuel, target, or neutron spectrum shifting neutral.

7 Claims, 1 Drawing Figure

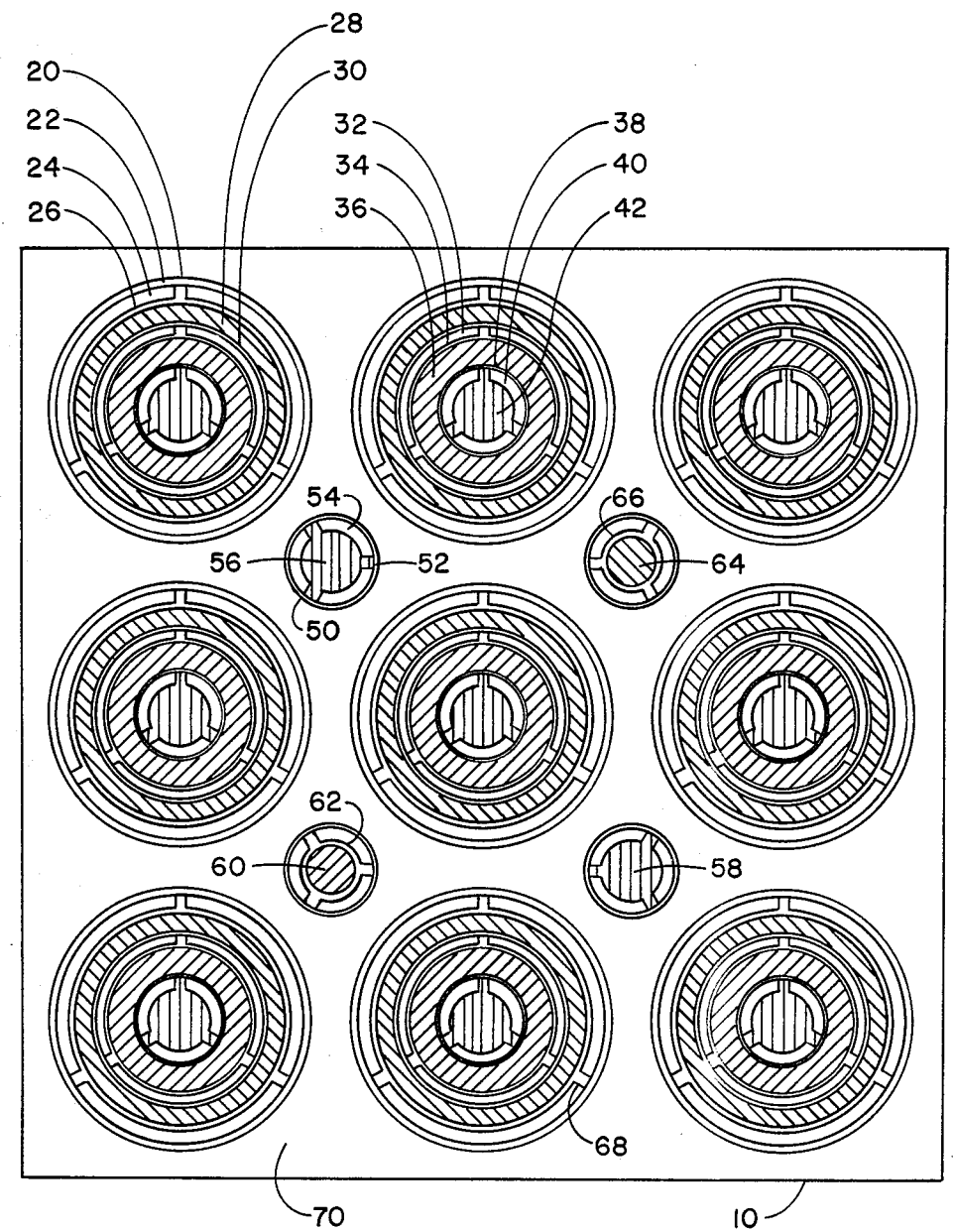
FIG.

FUEL ASSEMBLY FOR THE PRODUCTION OF TRITIUM IN LIGHT WATER REACTORS

BACKGROUND OF THE INVENTION

The invention relates generaly to nuclear fuel assemblies, and more particularly to a nuclear fuel assembly for the production of tritium in a light water reactor. The United States Government has rights in this invention pursuant to Contract No. DE-AC06-76RL01857 between the U.S. Department of Energy and UNC Nuclear Industries, Inc. and pursuant to Section 152 of the Atomic Energy Act of 1954.

Prior art tritium production reactors have been either light-water cooled, graphite moderated or heavy-water moderated, heavy-water cooled. No tritium manufacture has occurred in the light-water moderated nuclear reactors which are currently popular for the production of electricity. Others have proposed the production of tritium in LWR reactors. These proposals centered on fuel being carried in fuel assemblies and lithium being carried in separate target assemblies.

This type of design is inefficient in the use of neutrons in that a neutron formed in a fuel region has a greater chance of being absorbed before it migrates to a target region.

It is accordingly, a general object of the invention to provide a nuclear fuel assembly for a light water reactor which produces tritium while being economical in the use of neutrons.

It is a further object of the invention to provide a nuclear fuel assembly from which individual subassemblies may easily be removed and replaced.

Other objects, advantages and novel features of the invention will be apparent to those of ordinary skill in the art upon examination of the following detailed description of a preferred embodiment of the invention and the accompanying drawing.

SUMMARY OF THE INVENTION

The invention comprises a nuclear fuel assembly composed of two intermeshing arrays of subassemblies. The first subassemblies comprise concentric annular elements of an outer containment tube, an annular target element, an annular fuel element, and an inner neutron spectrum shifting rod. The second subassemblies comprise an outer containment tube and an inner rod of either fuel, target, or nuetron spectrum shifting material.

BRIEF DESCRIPTION OF THE DRAWING

The FIGURE is a cross sectional view of the nuclear assembly in accordance with the invention.

DETAILED DESCRIPTION OF A PREFERRED EMBODIMENT

Turning now to the FIGURE, a cross-sectional view of the nuclear fuel assembly of the present invention is shown. Generally speaking, the nuclear fuel assembly 10 comprises a 3×3 rectangular array of larger subassemblies 20 with a 2×2 rectangular array of small subassemblies 50 with the smaller subassemblies located within the interstices between the larger subassemblies.

The larger subassemblies 20 comprise a number of concentric cylindrical or annular members. The outermost member is a pipelike process tube 22 which serves to contain the inner elements of the larger subassembly and to channel the flow of cooling water around these elements. The process tube is made of a material which is compatible with the high temperature water and high neutron flux found in a light water reactor; this material may preferably be a zirconium alloy or stainless steel.

Located next inwardly in the larger subassembly is a first annular channel 24. This is the first of three annular channels within the larger subassembly for the passage of cooling water.

Located within the channel 24 is an annular target element 28. The target element is comprised of a lithium bearing material. When placed in an operating nuclear reactor, the lithium interacts with neutrons to form tritium. By using a getter such as zirconium to tie up the tritium, excessive gas pressure is avoided within the target element. The target element is clad on its surfaces by an outer layer of zirconium cladding 26 and an inner layer of zirconium cladding 30 in order to prevent interaction of the target material with the reactor cooling water and to prevent the loss of the tritium. If necessary, a tritium barrier such as a thin layer of aluminum may be placed between the lithium bearing material and the zirconium cladding. This barrier would serve to minimize tritium diffusion through the zirconium cladding and help prevent hydrogen embrittlement.

Located next inwardly in the larger subassembly is a second annular channel 32. This annular channel serves as a passageway for the flow of cooling water.

Located within the channel 32 is an annular fuel element 36. The fuel element is comprised of uranium enriched in a fissionable isotope such as U-235 or Pu-239 and serves to support the neutronic chain reaction within the reactor. Inner and outer zirconium cladding 34 and 38 are employed to isolate the fuel element from the cooling water and eliminate contamination of the cooling water by fission products.

Located next inwardly in the larger subassembly is a third annular channel 40. This annular channel serves as a passageway for the flow of cooling water.

Finally, located within the channel 40 is an innermost rod of zirconium 42. This rod serves to shift the neutron spectrum within the reactor by changing the volume of water surrounding the fuel and consequently the thermalization rate of the neutrons. By removing the rod during the operating cycle of the reactor, the reactivity of the core may be adjusted.

The smaller subassemblies 50 are of similar but simpler construction. An outermost member 52 is a pipelike process tube which serves to contain the inner elements and to channel the flow of cooling water.

Located next inwardly is an annular channel 54 which conducts the flow of cooling water.

Finally, at an innermost location is a rod 56 which serves to trim the neutron flux to a desired level within the reactor. This innermost rod may be a zirconium rod 58, a rod of fuel 60 clad in zirconium 62 or a rod of lithium bearing material 64 clad in zirconium 66.

In order to maintain the spacing between all of the elements of each subassembly projections 68 may be formed in the surface of the elements.

Each subassembly is arranged generally parallel to the others and generally perpendicular to at least one tubesheet 70 in a manner analogous to that of a tubesheet in a steam boiler.

In the operation of a reactor using the present invention, periodically a fuel assembly 10 may be removed for maintenance. At that time, leaking subassemblies may be replaced, as may be individual fuel or target elements which are spent. As discussed, at this point alternate innermost rods may be inserted to adjust the neutron flux within the reactor.

The foregoing description of a preferred embodiment of the invention has been presented for purposes of illustration and description and is not intended to be exhaustive or to limit the invention to the precise form disclosures. It was chosen and described in order to best explain the principles of the invention and their practical application to thereby anable others skilled in the art to best utilize the invention in various embodiments and with various modifications as are suited to the particular use contemplated. It is intended that the scope of the invention be defined by the claims appended hereto.

We claim:

1. A nuclear fuel assembly comprising:
  (a) a square array of first subassemblies; and
  (b) a square array of second subassemblies; wherein the second subassemblies are dimensionally smaller than the first subassemblies, the second subassemblies are located within the interstices between the first subassemblies, and wherein each first subassembly comprises in concentric arrangement;
  (c) an outermost containment tube;
  (d) a first annular channel for the passage of cooling water;
  (e) a tubular target element comprising lithium bearing material and surfaced with inner and outer layers of zirconium cladding;
  (f) a second annular channel for the passage of cooling water;
  (g) a tubular fuel element comprising enriched uranium and surfaced with inner and outer layers of zirconium cladding;
  (h) a third annular channel for the passage of cooling water; and
  (i) an innermost rod of zirconium neutron spectrum shifting material.

2. The nuclear fuel assembly of claim 1 wherein each second subassembly comprises in concentric arrangement:
  (a) an outermost containment tube;
  (b) an annular channel for the passage of cooling water; and
  (c) a removable innermost rod.

3. The nuclear fuel assembly of claim 2 wherein the removable innermost rod is made of zirconium neutron spectrum shifting material.

4. The nuclear fuel assembly of claim 2 wherein the removable innermost rod is made of enriched uranium and surfaced with an outer layer of zirconium cladding.

5. The nuclear fuel assembly of claim 2 wherein the removable innermost rod is made of lithium bearing material and surfaced with an outer layer of zirconium cladding.

6. The nuclear fuel assembly of claim 1 wherein the arrays of first and second subassemblies are held in rigid spatial relationship by perpendicular intersection with a tubesheet.

7. The nuclear fuel assembly of claim 1 wherein the array of first subassemblies is 3×3 and the array of second subassemblies is 2×2.

* * * * *